Patented Oct. 18, 1949

2,485,253

UNITED STATES PATENT OFFICE 2,485,253

BILE ACID AMIDES OF DIAMINODIPHENYL-SULFONE

Arpad Berczeller, New York, N. Y.

No Drawing. Application July 23, 1946,
Serial No. 685,767

10 Claims. (Cl. 260—397.1)

The present invention relates to steroid acid derivatives of 4,4'-diamino diarylsulfones, and more particularly to 4,4'-diamino diphenylsulfones, acylated on at least one of the amino groups by a cholanic or bile acid.

The strong bactericidal action of 4,4'-diamino diphenylsulfone has been known for some time but from the practical standpoint this bactericidal activity has proved to be of little value because of the high toxicity of the compound. Various efforts have been made to reduce toxicity as by acylating one or both of the amino groups with lower aliphatic acid groups, or with the benzoyl group, and in other ways, but reduction of toxicity was always accompanied by considerable reduction of activity. Besides, certain of the known derivatives, such as the sodium formaldehyde sulfoxylate derivatives, proved to be unstable, and unreliable so far as detoxification was concerned. So far as I am aware, no satisfactory therapeutic agent based on 4,4'-diamino-diphenylsulfone has yet been developed.

It is the general object of the present invention to provide derivatives of 4,4'-diamino diarylsulfones, and particularly of the diphenylsulfones, which possess the high bactericidal and bacteriostatic action of the unsubstituted diamino diarylsulfone, but have so low a toxicity that the same can be safely administered in the necessary dosages. Other objects of the invention will appear from the more detailed description hereinafter.

I have found that acids of the steroid series, and especially the cholanic acids known as the bile acids, which include cholic, dexoycholic, dehydrocholic, dehydrodesoxycholic, lithocholic, dehydrolithocholic and "choleic" acids, and naturally occurring conjugated bile acids, like taurocholic acid, as well as cholanic acid itself, when substituted in one or both of the amino groups of the diamino diarylsulfone, not only reduce the toxicity of the parent substance, but preserve to a large extent, and from certain aspects even improve the bactericidal and bacteriostatic action thereof. Tests made with bile acid derivatives of 4,4'-damino diphenylsulfone have shown that these substances are highly active against streptococci. My new compounds have also shown a quite remarkable anti-biotic action on the tubercle bacillus, while yet having, as already indicated, a low toxicity toward animals. Accordingly, the bile acid derivatives appear to offer the most effective therapeutic drugs for the treatment of tuberculosis.

While I do not wish to be understood as being committed to this theory, I offer as a possible explanation both of the reduced toxicity and of the activity of my new therapeutic agents against the tubercle bacillus, the fact that the steroid acids are of very high molecular weight and have a chemical structure identical with or similar to many essential constituents and metabolites of plants and animals. My compounds may then through competitive action interfere with and block the metabolism of the micro-organisms, and especially of the tubercle bacillus which, as its high lipin content indicates, is probably most vulnerable to interference with its lipin metabolism. In the case of the bile acids, there exists also a pronounced lypophilic and surface active action which may account for a penetration into and event a disintegrating action on the tubercle bacilli, and may account by the same token for the easier diffusion through the avascular tuberculous granulation tissue.

The therapeutic agents of the present invention may be administered in the same manner and in substantially the same dosages as, or in even smaller dosages than, are commonly employed in the administration of the sulfa drugs even though they are tolerated in higher quantities. Because of the high therapeutic efficiency and low toxicity of the new compounds, dosages can be resorted to which will act effectively on the tubercle bacillus in walled-off lesions.

The compounds of the present invention are characterized by the feature that at least one of the amino groups of a 4,4'-diamino diarylsulfone is acylated with a steroid acid, particularly a bile acid. The second amino group can be either unsubstituted, or substituted by a bile acyl group, or by another substantially non-toxic acyl group like acetyl, propionyl, valeryl, benzoyl, and other acyl groups of the aliphatic and aromatic series. Where one of the amino groups is to remain free, it is preferable to employ as the starting sulfone, a 4-nitro-4'-amino compound, the intermediate 4-nitro-4'-bile acylamino compound being then reduced in known manner to the corresponding 4-amino 4'-bile acylamino diarylsulfone. This mono-acylated compound can then, if desired, be acylated by treatment with the chloride or anhydride of another acid to produce a mixed diacylated product. The latter can be prepared also by starting with a monoacylated 4,4'-diamino diarylsulfone and treating the same with a bile acid chloride. It will be obvious that the two different acid groups on the two amino groups can be different bile acid groups. The production of a compound wherein both of the amino groups are acylated with the same bile acid can be effected simply by employing the necessary quantity of the bile acid chloride in the course of the acylation.

The bile acid chlorides employed in producing the compounds of the present invention are prepared in known manner, preferably after esterifying in alcoholic hydroxyl groups contained in the bile acid molecule by means of an acid which can be readily split off by hydrolysis. For this purpose the formic acid esters are generally the most suitable, but the carboethoxy derivatives may likewise be used.

Preparation of a number of the compounds in the present invention will be described more in detail by way of illustration in the following examples:

EXAMPLE I

4-cholylamino 4' amino diphenylsulfone

Twelve g. of 4-nitro 4' aminodiphenylsulfone were dissolved at 100° C. in 100 cc. of dry pyridine. 18 g. of freshly prepared triformylcholyl chloride were added and the temperature kept at 105° C. for one hour. This solution was cooled slowly and kept at room temperature for six to eight hours. It was poured into 1000 cc. of a 20 per cent solution of HCl. There separated a gelatinous greenish brown-colored mass which after further thorough mixing with the acid solidified. It was filtered and washed thoroughly with distilled water and sucked dry. It was then suspended in N/NaOH, filtered, washed thoroughly with distilled water until acid reaction of the washings was obtained; filtered, and sucked dry. The crude nitro derivative thus obtained was used for further work-up.

Ten g. of the crude nitro derivative were suspended in 60 cc. of alcohol, boiled, and a solution of 21 g. of stannous chloride in 60 cc. alcohol added. The mixture was refluxed for 15 minutes, then cooled first to room temperature, and then in the ice box, and later filtered. To the filtrate 75 cc. of 40 per cent NaOH were added, followed by one liter of distilled water. A precipitate formed which was filtered and thoroughly washed with water until acid reaction of the washings was obtained. It was suspended in 150 cc. of alcohol, one g. of "Darco" was added, and the mixture refluxed for 30 minutes. It was filtered hot and the alcoholic solution precipitated by addition of 10 volumes of distilled water. The precipitate was filtered and sucked dry, and redissolved in alcohol. Immediate crystallization could be obtained from about 35 per cent alcohol with addition of 0.04 per cent NaOH using considerable dilutions (final dilutions of 1–1000 and 1–1400 were used in this first crystallization). The compound can be easily purified by recrystallization from 50 per cent alcohol.

The product is very slightly soluble in water, almost insoluble in N/NaOH and N/HCl. It is very easily soluble in alcohol, acetone and propylene glycol.

M. P. 175–178° C. (uncorrected).

Crystals—colorless needles in bunches and rosettes. General formula: $C_{36}H_{50}O_6SN_2$. (M. W. 638.836.)

Analysis

| Calculated | | Found | |
|---|---|---|---|
| N | S | N | S |
| Per cent 4.38 | Per cent 5.01 | Per cent 4.33 | Per cent 5.09 |

*Biological tests.*—Toxicity: Administered per os as a watery suspension to mice of 18 to 20 g. body weight, 250 mg. were tolerated without any symptoms. No lethal dose could be determined. This compound is thus at least 80 times less toxic than diaminodiphenylsulfone.

Feeding of mice with a drug-food mixture containing 0.09% of the drug for seven days was found to protect the animal more or less indefinitely (observation over 28 days) against streptococcus hemolyticus peritonitis. The compound therefore proved to be as active as the highly toxic diamino diphenylsulfone.

In vitro tests for anti-tubercular activity: Added to Proskauer-Beck's synthetic media this compound shows marked bacteriostatic activity against the growth of virulent human tubercle bacilli in a concentration as small as 0.1 mg. per cent, that is, in a dilution of 1–1,000,000. It is in this respect about 10 times more active than diaminodiphenylsulfone.

EXAMPLE II

4-desoxycholylamino 4'-diphenylsulfone 12 g. of 4-nitro 4'-aminodiphenylsulfone were dissolved at 90° C. in 100 cc. of dry pyridine and 18 g. of freshly prepared diformyl-desoxycholyl-chloride were added and the solution kept at 100° C. for one hour. It was cooled slowly, kept at room temperature for 6–8 hours, filtered, and then poured into 1000 cc. of a 20 per cent solution of concentrated HCl. A gelatinous greenish brown-colored mass separated out, which after further thorough agitation with the acid, became solid. It was filtered and washed thoroughly with distilled water and sucked dry. It was then suspended in N/NaOH, filtered, washed thoroughly with distilled water until acid reaction of the washings was obtained; then suspended in water, again filtered, and sucked dry.

10 g. of the so obtained crude nitro derivative were suspended in 60 cc. of boiling alcohol and a solution of 21 g. of stannous chloride in 60 cc. of alcohol added. One g. of "Darco" was added, and the mixture was refluxed for 15 minutes. It was cooled, first to room temperature and then in the ice box, and filtered. To the filtrate, 75 cc. of 40 per cent NaOH were added, followed by one liter of distilled water. A precipitate formed which was filtered and thoroughly washed with water until acid reaction of the washings. It was suspended in 150 cc. of alcohol. One gram "Darco" was then added, and the mixture refluxed for 30 minutes. It was filtered hot and the alcoholic solution precipitated by addition of 10 volumes of distilled water. The precipitate was filtered, sucked dry and redissolved in alcohol. Crystallization could be obtained from about 35 per cent alcohol upon addition of 0.04 per cent NaOH. The compound can be easily purified by recrystallization from 50 per cent alcohol.

The compound is almost insoluble in water, N/NaOH and N/HCl. It is very easily soluble in alcohol, acetone and propylene glycol.

M. P. 162–164°.

Crystals—colorless needles in bunches and rosettes.

General formula:

$C_{36}H_{50}O_5SN_2$. (M. W. 622.836.)

Analysis

| Calculated | | Found | |
|---|---|---|---|
| N | S | N | S |
| Per cent 4.50 | Per cent 5.15 | Per cent 4.29 | Per cent 5.03 |

EXAMPLE III

*4-lithocholylamino 4'-aminodiphenylsulfone*

First formyl lithocholic acid and formyl lithocholyl chloride were prepared using essentially Cortese and Baumann's procedure devised for the analagous cholyl and desoxycholyl compound. It was necessary to use higher temperatures to obtain formyl lithocholic acid.

Synthesis of formyl lithocholic acid: To nine grams of lithocholic acid, 20 cc. of formic acid were added. The mixture was heated to 90° C. A solution was obtained which was kept at 90° C. for five hours. It was then evaporated at the same temperature to complete dryness. The residue was dissolved in 150 cc. of boiling alcohol, and to this solution 90 cc. of distilled water were added at a slow rate. The hot solution was poured into a large dish and stirred until crystals appeared. After 24 hours at room temperature the crystals were filtered, washed with distilled water and dried. It was recrystallized from alcohol with insignificant loss. The crystals were in the form of flakes which had an M. P. of 138° C.

Formyl lithocholyl chloride was prepared with thionyl chloride in exactly the same way as triformyl cholyl chloride according to Cortese and Baumann. The freshly prepared material was used for the following synthesis:

4 grams of 4-nitro 4'-amino diphenylsulfone were dissolved in 50 cc. of dry pyridine at 100° C. and 6 grams of formyl lithocholyl chloride were added and the temperature kept at 105° C. for one hour. The mixture was cooled slowly, and kept at room temperature for 6–8 hours. It was then filtered and poured into 500 cc. of a 20 per cent solution of concentrated HCl. A brownish green gelatinous mass separated which became solid after further thorough mixing with the acid. The precipitate was filtered, washed thoroughly with distilled water, and sucked dry.

Five grams of the crude nitro compound were suspended in 30 cc. of alcohol and the mixture raised to the boiling point. To the boiling suspension 10 g. of stannous chloride dissolved in 30 cc. of alcohol were added and the mixture refluxed for 15 minutes. The solution was cooled and filtered, and to the filtrate 50 cc. of 40 per cent NaOH were added, followed by 500 cc. of water. A precipitate formed which was filtered and washed with water until washings became acid, and then sucked dry. It was suspended in 80 cc. of alcohol, 0.5 g. "Darco" was added, and the mixture refluxed for 30 minutes, and then filtered hot. The filtrate was precipitated with 10 volumes of water. The precipitate was soluble in alcohol, and could be crystallized from 35 per cent alcohol made alkaline with NaOH, and recrystallized from 50 per cent alcohol. The compound is almost insoluble in water, N/NaOH, and N/HCl. It is readily soluble in acetone and in propylene glycol. Crystals colorless.

M. P. 164° (uncorrected).

General formula:

$C_{36}H_{50}O_4SN_2$. = (M. W. 606.836.)

Analysis

| Calculated | | Found | |
|---|---|---|---|
| N | S | N | S |
| Per cent 4.62 | Per cent 5.28 | Per cent 4.55 | Per cent 5.05 |

EXAMPLE IV

*4-cholylamino 4'-acetylamine diphenylsulfone*

4 g. of 4-acetylamino 4' aminodiphenylsulfone were dissolved in 50 cc. of dry pyridine at 100° C. 6 g. of freshly prepared triformylcholylchloride were added and the temperature kept at 105° C. for one hour. The solution was cooled slowly and kept at room temperature for 6–8 hours. It was then poured into 500 cc. of 20 per cent concentrated HCl. The precipitate which formed was filtered, washed thoroughly with distilled water, treated with N/NaOH, and again washed thoroughly. It was then dissolved in alcohol, "Darco" was added, and the mixture refluxed for 30 minutes, and then re-precipitated by addition of water. After repeated re-precipitation and treatment with charcoal, an almost white, but slightly yellow powder was obtained which separated from dilute alcohol in fine droplets.

M. P. 186–189° C.

General formula: $C_{38}H_{52}O_7SN_2$. (M. W. 680.870.)

Analysis

| Calculated | | Found | |
|---|---|---|---|
| N | S | N | S |
| Per cent 4.11 | Per cent 4.70 | Per cent 4.02 | Per cent 4.58 |

EXAMPLE V

*4,4'-dicholyldiaminodiphenylsulfone*

2 g. of diaminodiphenylsulfone were dissolved in 30 cc. of dry pyridine at 100° C., and 4 g. of freshly prepared triformylcholylchloride were added, and the temperature kept at 105° C. for 6–8 hours. The mixture was filtered and the filtrate poured into 300 cc. of 20 per cent concentrated HCl. A brown gelatinous mass separated out which, as in the preceding examples, became solid after agitation with the acid. The precipitate was filtered, washed thoroughly with distilled water, and sucked dry. It was then dissolved in alcohol and precipitated with N/NaOH, redissolved in alcohol, and re-precipitated with N/HCl. This treatment was repeated several times in order to extract the non-reacted diaminodiphenylsulfone and cholic acid. Further purification was accomplished by refluxing in alcoholic solution after addition of "Darco." Ultimately an almost white powder was obtained. From dilute alcohol it separates in fine refringent spherical and minute rod-shaped particles. The compound is almost insoluble in water, N/NaOH and N/HCl, whereas diaminodiphenylsulfone is soluble in acid and cholic acid is soluble in alkali. The compound is readily soluble in alcohol, acetone and propylene glycol.

Biological test: Given as a watery suspension to white mice of 16-20 g. body weight, 150 mg. were tolerated without any symptoms. This compound then is at least 50 times less toxic than diaminodiphenylsulfone. Feeding mice with a drug-food mixture containing 0.04% of the compound for seven days protected the animal against streptococcus hemolyticus peritonitis for an indefinitely long period (observation over 28 days). The activity of the compound is thus equal to diaminodiphenylsulfone.

General formula:

$C_{60}H_{88}O_{10}SN_2$. (M. W. 1029.380)

*Analysis*

| Calculated | | Found | |
|---|---|---|---|
| N | S | N | S |
| Per cent 2.72 | Per cent 3.11 | Per cent 2.81 | Per cent 3.19 |

EXAMPLE VI

*4-4' di-desoxycholyldiaminodiphenylsulfone*

2 g. of diaminodiphenylsulfone were dissolved in 30 cc. of dry pyridine at 90° C. 4 g. of freshly prepared diformyldesoxycholylchloride were added and the temperature kept at 100° C. for one hour. The solution was cooled and kept at room temperature for 6-8 hours, and then was filtered. It was poured into 300 cc. of 20 per cent solution of concentrated hydrochloric acid. A brown gelatinous mass separated out which became solid after thorough agitation with the acid. It was filtered, washed thoroughly with distilled water and dried. It was treated with N/NaOH and N/HCl and further purified by treatment with "Darco" like the cholic acid derivative of Example V. An almost white powder was finally obtained.

General formula: $C_{60}H_{88}O_8SN_2$. (M. W. 997.38.)

| Calculated | Found |
|---|---|
| S | S |
| Per cent 3.2 | Per cent 2.99 |

While my investigations have been directed primarily to the cholanic or bile acyl derivatives of 4,4' diamino diphenylsulfone, it is evident that analagous derivatives can be prepared with other steroid acids, like cholanic acid itself, norcholanic, bisnor cholanic and etio-cholanic acids, the corresponding cholenic acids and also those acids which are substituted by a hydroxyl in the 3-position (of which lithocholic acid is an example), such acids having a molecular weight of the order of the bile acids, and having properties in common with the bile acids. Also, it is plain that in place of the diphenyl compounds, phenyl-pyridyl and phenyl-naphthyl compounds will yield steroid acid derivatives, and especially bile acyl derivatives, having improved therapeutic activity imparted by the steroid acid group. In the case of naphthalene compounds, the position of the amino group will be at the 4 or paracarbon where the 1-carbon is joined to the sulfone group; the amino group can, however, also be at the 6 or 7-carbon of the nucleus. It will be evident to the chemist that the diamino phenyl-pyridyl, and the diamino phenyl-naphthyl sulfones can be reacted in the same way with the steroid acid chlorides as the diamino diphenyl-sulfones and I accordingly regard the analogous steroid acid derivatives of diamino diarylsulfones as equivalents.

The hydroxyl groups of the bile acid radicals and the free amino group of the monoacylated sulfones can be reacted in known manner to form derivatives having a higher solubility in water, as by conversion into sulfonates at one or more hydroxyl groups, and into sodium formaldehyde sulfoxylates at the free amino group.

I claim:

1. As a therapeutic agent having bacteriostatic action, N-acylated 4,4'-diamino diphenyl sulfone, the acyl group being that of a cholanic acid.

2. As a therapeutic agent having bacteriostatic action, N-acylated 4,4'-diamino diphenyl sulfone, the acyl group being that of a bile acid.

3. As a therapeutic agent having bacteriostatic action, mono-N-acylated 4,4'-diamino diphenyl sulfone, the acyl group being that of a bile acid.

4. As a therapeutic agent having bacteriostatic action, di-N-acylated 4,4'-diamino diphenyl sulfone, the acyl group being that of a bile acid.

5. As a therapeutic agent having bacteriostatic action, 4-cholylamino 4'-amino diphenyl sulfone.

6. As a therapeutic agent having bacteriostatic action, a cholylamide of 4,4'-diamino diphenyl sulfone.

7. As a therapeutic agent having bacteriostatic action, desoxycholylamide of 4,4'-diamino di-diphenyl sulfone.

8. As a therapeutic agent having bacteriostatic action, 4,4'-di-(cholylamino) diphenyl sulfone.

9. As a therapeutic agent having bacteriostatic action, 4,4'-di-(desoxycholylamino) diphenyl sulfone.

10. Mono-N-acylated 4,4'-diaminodiphenyl sulfone, the acyl group being that of a cholanic acid.

ARPAD BERCZELLER.

REFERENCES CITED

The following references are of record in the file of this patent:

UNITED STATES PATENTS

| Number | Name | Date |
|---|---|---|
| 1,677,554 | Gams et al. | July 17, 1928 |
| 2,291,285 | Pohls et al. | July 28, 1942 |
| 2,325,344 | Shonel et al. | July 27, 1943 |